US012679423B2

(12) United States Patent
Kamijo

(10) Patent No.: US 12,679,423 B2
(45) Date of Patent: Jul. 14, 2026

(54) DRIVING SUPPORT APPARATUS

(71) Applicant: TOYOTA JIDOSHA KABUSHIKI KAISHA, Toyota (JP)

(72) Inventor: Kentaro Kamijo, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 18/889,558

(22) Filed: Sep. 19, 2024

(65) Prior Publication Data

US 2025/0128739 A1 Apr. 24, 2025

(30) Foreign Application Priority Data

Oct. 24, 2023 (JP) ................................. 2023-182201

(51) Int. Cl.
*B60W 60/00* (2020.01)
*B60W 50/06* (2006.01)
*B60W 50/10* (2012.01)
*B60W 50/14* (2020.01)

(52) U.S. Cl.
CPC ........ *B60W 60/0053* (2020.02); *B60W 50/06* (2013.01); *B60W 50/10* (2013.01); *B60W 50/14* (2013.01); *B60W 60/001* (2020.02)

(58) Field of Classification Search
CPC ...... B60W 50/10; B60W 30/09; B60W 10/06; B60W 10/20; B60W 30/146; B60W 30/181; B60W 60/053; B62D 15/02; B62D 15/0285; G06F 18/2413; F04B 11/0016
See application file for complete search history.

(56) References Cited

U.S. PATENT DOCUMENTS

| | | | |
|---|---|---|---|
| 6,445,984 B1* | 9/2002 | Kellogg | B62D 15/02 318/587 |
| 10,839,678 B2 | 11/2020 | Urano | |
| 2014/0219848 A1* | 8/2014 | Rabhi | F04B 11/0016 418/24 |
| 2017/0113688 A1* | 4/2017 | Nakatsuka | B60W 30/181 |
| 2018/0354515 A1* | 12/2018 | Allexi | B60W 30/146 |
| 2019/0295419 A1 | 9/2019 | Tosa et al. | |
| 2019/0311272 A1 | 10/2019 | Kamata et al. | |

(Continued)

FOREIGN PATENT DOCUMENTS

JP 2022-133181 A 9/2022

*Primary Examiner* — Yuri Kan
(74) *Attorney, Agent, or Firm* — Sughrue Mion, PLLC

(57) ABSTRACT

A driving support apparatus executes an automatic driving control for controlling a behavior of a vehicle to reproduce a learned behavior. The driving support apparatus starts a behavior control for controlling the behavior of the vehicle based on the learned behavior, when the vehicle arrives at a control start point during the automatic driving control. The control start point is specified based on a start point at which the manual operation was performed and a preference of a user. The driving support apparatus controls the behavior of the vehicle based on the manual operation and determines whether or not the manual operation is caused by the external environment, when the manual operation performed during the automatic driving control satisfies an override condition. When the manual operation is not caused by the external environment, the driving support apparatus suggests to the user to change the preference.

4 Claims, 7 Drawing Sheets

(56)        References Cited

U.S. PATENT DOCUMENTS

| 2021/0155232 A1* | 5/2021 | Ike ......................... B60W 10/20 |
| 2022/0041157 A1* | 2/2022 | Imamura ............... B60W 10/06 |
| 2022/0274585 A1 | 9/2022 | Yamaguchi et al. |
| 2024/0140402 A1* | 5/2024 | Murai ................ B62D 15/0285 |
| 2025/0002032 A1* | 1/2025 | Kentley-Klay ..... G06F 18/2413 |
| 2025/0002046 A1* | 1/2025 | Kentley-Klay ....... B60W 30/09 |

* cited by examiner

BEHAVIOR INFORMATION

| START POINT | END POINT | TYPE | ACCELERATION | STEERING ANGLE |
|---|---|---|---|---|
| Xs1,Ys1 | Xe1,Ye1 | DECCELERATION | Ga1,··· | – |
| Xs2,Ys2 | Xe2,Ye2 | STEERING | – | $\theta$ sa2,··· |
| Xs3,Ys3 | Xe3,Ye3 | ACCELERATION | Ga3,··· | – |
| ··· | ··· | ··· | ··· | ··· |

FIG.2

DRIVING SUPPORT APPARATUS

TECHNICAL FIELD

The present disclosure relates to a driving support apparatus configured to execute an automatic driving control for controlling a behavior of a vehicle so as to reproduce the behavior of the vehicle changed depending on a manual operation performed during manual driving.

BACKGROUND

Conventionally, there has been known a driving support apparatus configured to execute an automatic driving control for controlling a behavior of a vehicle so as to reproduce "a behavior of the vehicle learned during manual driving". For example, a driving support apparatus described in Patent Document 1 (hereinafter referred to as a "conventional apparatus") stores a driving route, a vehicle speed, a steering angle and a braking operation during training driving (the manual driving), and executes an automatic parking control, which is a type of the automatic driving control, based on the stored data.

Patent Document 1: Japanese Patent Application Laid-Open No. 2022-133181

SUMMARY

It is desirable that automatic driving control is executed based on a pre-designated user preference for the automatic driving control. For example, the above preference relates to whether a start timing of a behavior control for matching the behavior of the vehicle in the automatic driving control with that in the manual operation is earlier or later.

However, the preference designated by the user (hereinafter referred to as a "designated preference") may differ from the user's original preference (hereinafter referred to as an "original preference"). If the designated preference differs from the original preference, the automatic driving control that does not match the original preference will be executed, and the user is likely to feel uncomfortable with this automatic driving control. The conventional apparatus performs the automatic driving control without being based on the designated preference. Therefore, the conventional apparatus does not cause the above-mentioned problem.

The present disclosure is made to address the above problem. That is, one of the objects of the present disclosure is to provide a driving support apparatus reduces the possibility that the user feels uncomfortable with the automatic driving control by reducing the possibility that the automatic driving control which does not match the original preference is executed.

A driving support apparatus (10) according to the present disclosure (hereinafter, referred to as the "present disclosure apparatus") comprises:

a sensor (22) configured to acquire environmental information about an external environment of a vehicle; and a controller (20) configured to execute a learning control for learning, as a learned behavior, a behavior of the vehicle that changes due to a manual operation performed during manual driving (step 300 to step 395), and an automatic driving control for controlling the behavior of the vehicle to reproduce the learned behavior (step 500 to step 595).

The controller is configured to:

start a behavior control for controlling the behavior of the vehicle based on the learned behavior (step 545, step 535), when the vehicle arrives at a control start point ("Yes" at step 525) during the automatic driving control ("Yes" at step 505), wherein the control start point is specified based on a start point at which the manual operation was performed during the manual driving and a preference of a user for the automatic driving control designated by the user;

when the manual operation performed during the automatic driving control satisfies an override condition ("Yes" at step 515), control the behavior of the vehicle based on the manual operation (step 565) and determine whether or not the manual operation is caused by the external environment (step 560); and suggest to the user to change the preference (step 570), when it is determined that the manual operation is not caused by the external environment ("No" at step 560).

When the manual operation satisfies the override condition during the automatic driving, the present disclosure apparatus controls the behavior of the vehicle based on the manual operation and determines whether or not the manual operation is caused by the external environment. If the manual operation is not caused by the external environment, it is highly likely that the user intentionally performs the manual operation because the user feels uncomfortable with the automatic driving control. In other words, there is a high possibility that the designated preference differs from the original preference. For this reason, the present disclosure apparatus suggests to change the preference when the manual operation is not caused by the external environment. When the present disclosure apparatus suggests to change the preference, the user is more likely to change to the preference that matches the original preference. The present disclosure apparatus can reduce the possibility that automatic driving control that does not match the original preference is executed so that can reduce the possibility that the user feels uncomfortable with the automatic driving control.

BRIEF DESCRIPTION OF THE DRAWINGS

FIG. 2 is a drawing for illustrating behavior information stored in a behavior information storage device shown in FIG. 1.

DETAILED DESCRIPTION

Figure 1:
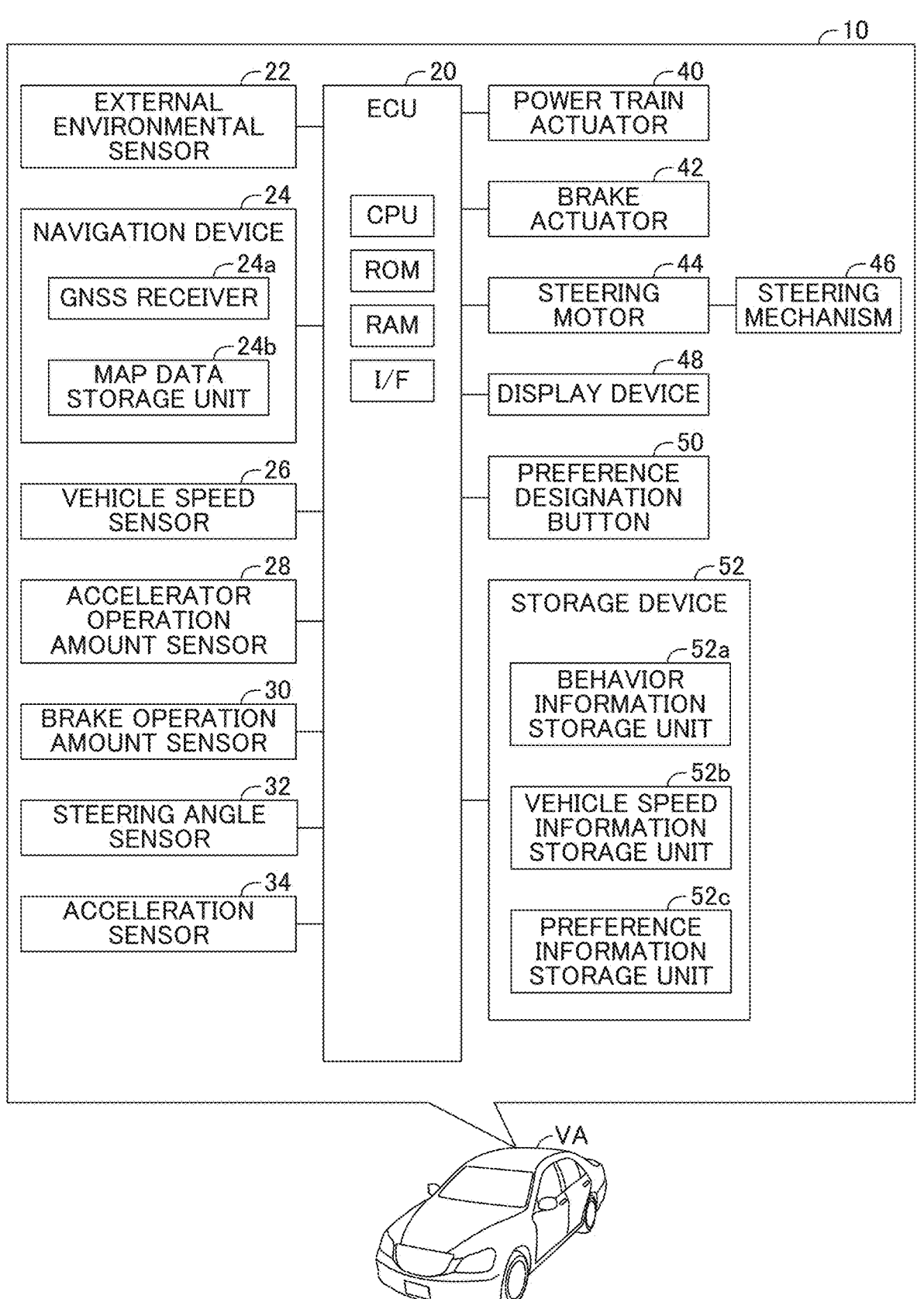
FIG. 1 is a schematic system configuration diagram of a driving support apparatus according to an embodiment of the present disclosure.

As shown in FIG. 1, a driving support apparatus 10 (hereinafter referred to as "the present apparatus 10") is applied to a host vehicle SV. The present apparatus 10 comprises components shown in FIG. 1.

An ECU 20 executes an automatic driving control, which is a type of automatic driving. In the automatic driving control, the ECU 20 automatically drives the vehicle VA according to a driving plan. The driving plan is generated based on a behavior of the vehicle VA learned during manual driving and preference information designated by a user.

In this specification, the "ECU 20" is an electronic control unit with a microcomputer as a main part. The ECU 20 is also referred to as a control unit, a controller and a computer. The microcomputer includes a CPU (processor), a ROM, a RAM, and an interface (I/F), etc. Functions realized by the ECU 20 may be realized by multiple ECUs.

An external environment sensor 22 acquires environmental information about an external environment of the vehicle VA. As an example, the external environment sensor 22 is a camera, which acquires image data as the environmental information by capturing scenery around the vehicle VA. The ECU 20 acquires the environmental information from the external environment sensor 22.

A navigation device 24 has a GNSS (Global Navigation Satellite System) receiver 24a and a map data storage unit 24b. The GNSS receiver 24a receives signals from a plurality of satellites and identifies the current position (latitude and longitude) of the vehicle VA based on the received signals. The map data storage unit 24b stores map data.

A vehicle speed sensor 26 measures a vehicle speed Vs, which represents a speed of the vehicle VA. An accelerator operation amount sensor 28 measures an accelerator operation amount AP, which represents an amount of operation of an accelerator pedal (not shown) of the vehicle VA. The brake operation amount sensor 30 measures a brake operation amount BP, which represents an amount of operation of a brake pedal (not shown) of the vehicle VA. A steering angle sensor 32 measures a steering angle θs of a steering wheel (not shown) from a neutral position. An acceleration sensor 34 measures an acceleration G of the vehicle VA.

A power train actuator 40 changes a driving force generated by a drive unit (e.g. an internal combustion engine and/or an electric motor) of the vehicle VA. A brake actuator 42 controls a braking force applied to the vehicle VA. A steering motor 44 is incorporated in a steering mechanism 46. The steering mechanism 46 is a mechanism for steering steered wheels in response to an operation on the steering wheel. The steering motor 44 generates an automatic steering torque in the steering mechanism 46 to change a steered angle of the steered wheels in response to an instruction from the ECU 20.

A display device 48 is a touch panel display and is arranged at a position visible to a driver in a cabin of the vehicle VA. A preference designation button 50 is a button for designating preference information regarding a user's preference for the automatic driving control. Specifically, the user designates one of "early", "normal" and "late" as preference information by operating the preference designation button 50.

A storage device 52 has a non-volatile storage area. A behavior information storage unit 52a, a vehicle speed information storage unit 52b and a preference information storage unit 52c has been set to this storage area.

Behavior information is stored in the behavior information storage 52a. The behavior information is information that associates a point at which a manual operation is performed during manual driving with a behavior of the vehicle VA that changes as a result of the manual operation. This behavior of the vehicle VA is referred to as a "learned behavior". As shown in FIG. 2, the behavior information includes a start point, an end point, a type, an acceleration, and the steering angle.

In the start point, a point at which the manual operation concerning the behavior of the vehicle VA is started is registered. In the end point, the point at which the manual operation is ended is registered. In the type, a type of the manual operation is registered. Specifically, one of "deceleration", "acceleration" and "steering" is registered in the type. The "deceleration" is an operation on the brake pedal by the driver to decelerate the vehicle VA. The "acceleration" is an operation on the accelerator pedal by the driver to accelerate the vehicle VA. The "steering" is an operation on the steering wheel to turn the vehicle VA.

If the type of the manual operation is either the "deceleration" or the "acceleration", the acceleration G at each point during a period in which the manual operation is being performed is registered in the acceleration. If the type of manual operation is the "steering", the steering angle θs at each point during the period in which the manual operation is being performed is registered in the steering angle.

Vehicle speed information is stored in the vehicle speed information storage unit 52b. The vehicle speed information is information that associates the vehicle speed Vs during the manual operation and the point at which the vehicle speed Vs is measured. The preference information designated by the user is stored in the preference information storage unit 52c.

Outline of Operation

The ECU 20 acquires the position of the vehicle VA, the behavior of the vehicle VA and the vehicle speed Vs during the manual operation, and stores the behavior information and the vehicle speed information in the behavior information storage unit 52a and the vehicle speed information storage unit 52b respectively. The ECU 20 stores the preference information designated by operating the preference designation button 50 in the preference information storage unit 52c.

When the user inputs a destination, the ECU 20 generates a route from the current position of the vehicle VA to the destination based on the map data and generates a driving plan including the route. In detail, the ECU 20 identifies a control start point based on "the start point identified based on the behavior information" and the preference information. The control start point is a point at which a behavior control is started. The behavior control is a control for matching the behavior of the vehicle VA during the automatic driving control with the behavior of the vehicle VA due to the manual operation(s) performed during the manual driving. The driving plan includes a start timing.

After generating the driving plan, the ECU 20 executes the automatic driving control. In the automatic driving control, the ECU 20 starts the behavior control when the ECU 20 determines that the vehicle VA arrives at the control start point by referring to the driving plan.

If the manual operation performed during the automatic driving control satisfies an override condition, the ECU 20 suspends the automatic driving control and executes "an override control for controlling the vehicle VA so that the behavior of the vehicle VA matches the behavior corresponding to the manual operation".

If the manual operation satisfies the override condition, the ECU 20 determines whether or not the manual operation is caused by the external environment based on the environmental information. In detail, if the ECU 20 determines that another vehicle (a preceding vehicle or an adjacent vehicles) exist around the vehicle VA, the ECU 20 determines that the manual operation is caused by the external environment. If the ECU 20 determines that no other vehicles exist around the vehicle VA, the ECU 20 determines that the manual operation is not caused by the external environment. The preceding vehicle is another vehicle travelling in front of the vehicle VA in an own lane in which the vehicle VA is travelling. The adjacent vehicle is another vehicle travelling in an adjacent lane which is adjacent to the own lane.

If the manual operation is not caused by the external environment, it is highly likely that the manual operation is caused by a fact that the automatic driving control does not match an original preference of the user. Therefore, if the ECU 20 determines that the manual operation is not caused by the external environment, the ECU 20 suggests to the user that the preference information should be changed. As an example, the ECU 20 displays a preference information change screen on the display device 48.

The user can know that the designated preference, which represents the preference specified by the preference information, is likely to be inconsistent with the original preference. This can increase a possibility that the user changes the preference information to a preference that matches the original preference. Therefore, the present apparatus 10 can reduce a possibility that the automatic driving control which does not match the original preference is executed, and can reduce a possibility that the user feels uncomfortable with the automatic driving control.

Specific Operation

Figure 3:
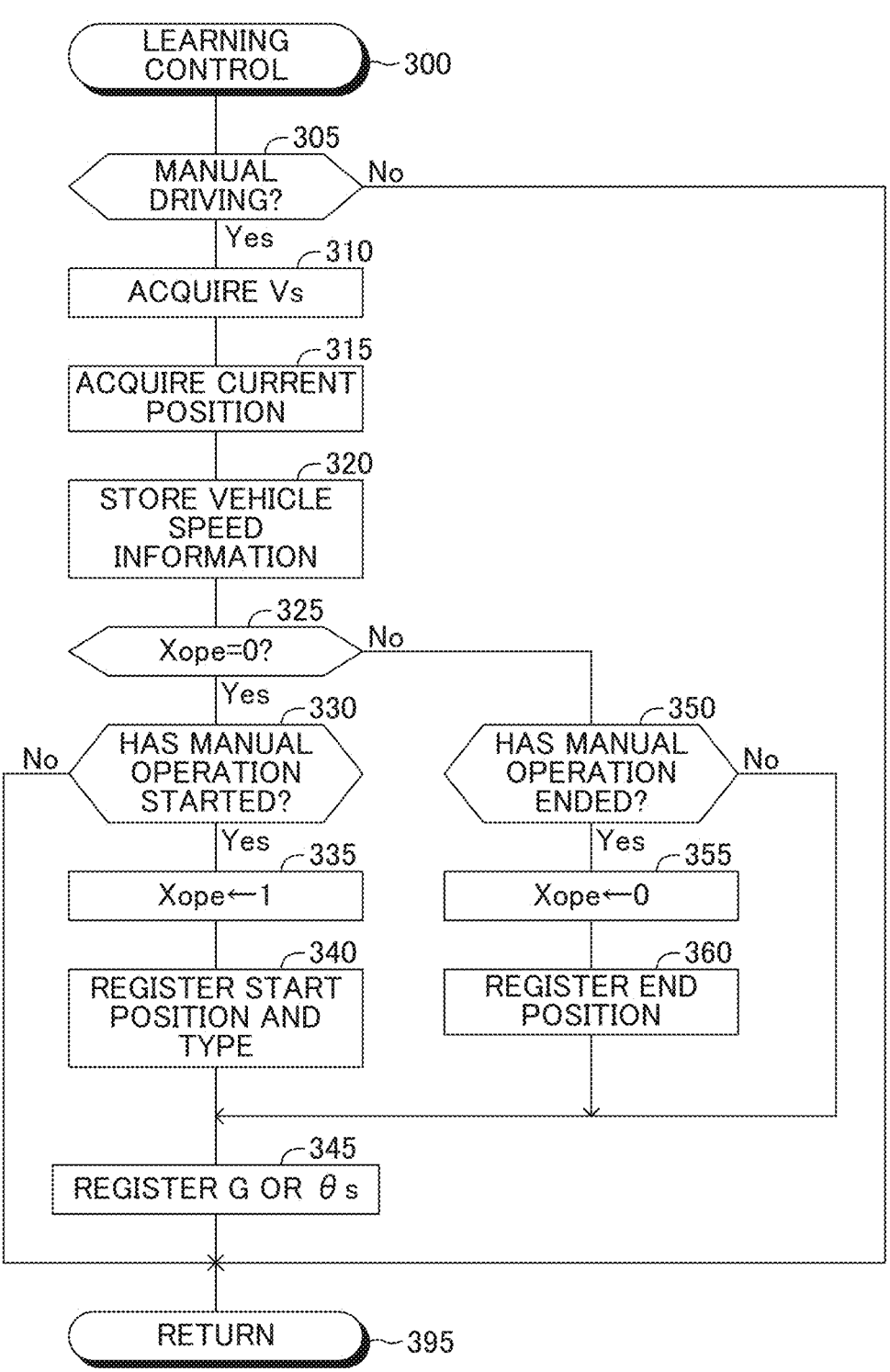
FIG. 3 is a flowchart illustrating a learning control routine executed by a CPU of an ECU shown in FIG. 1.
Figure 4:
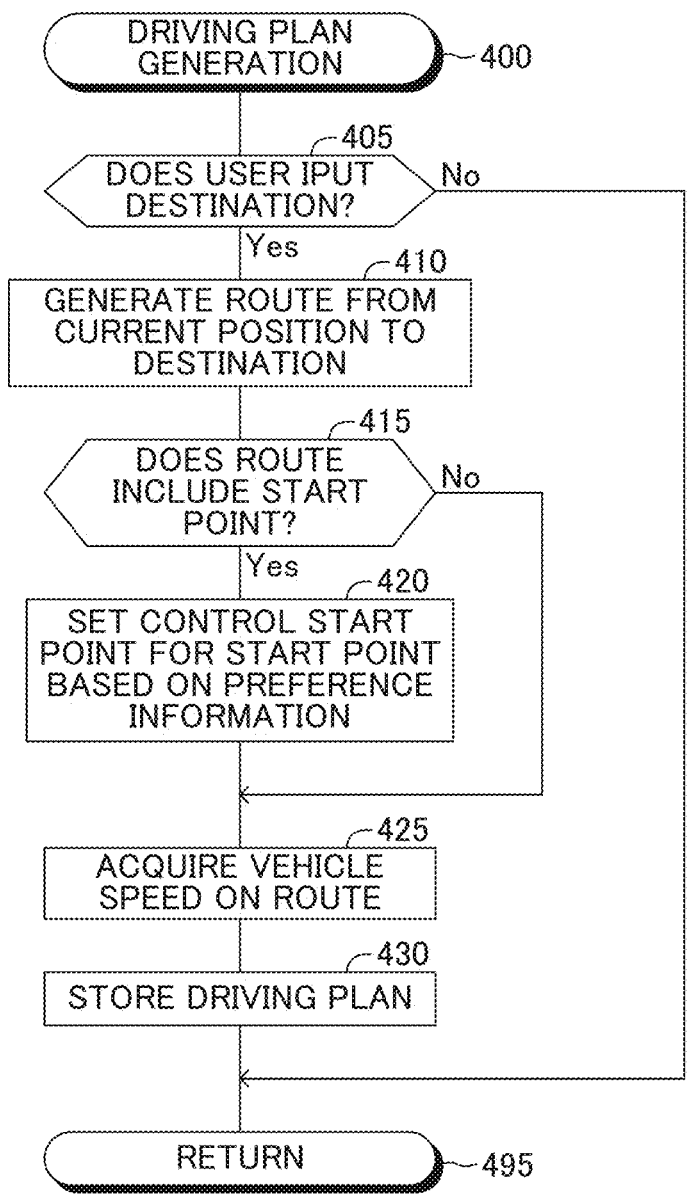
FIG. 4 is a flowchart illustrating a driving plan generation routine executed by the CPU of the ECU shown in FIG. 1.
Figure 5:
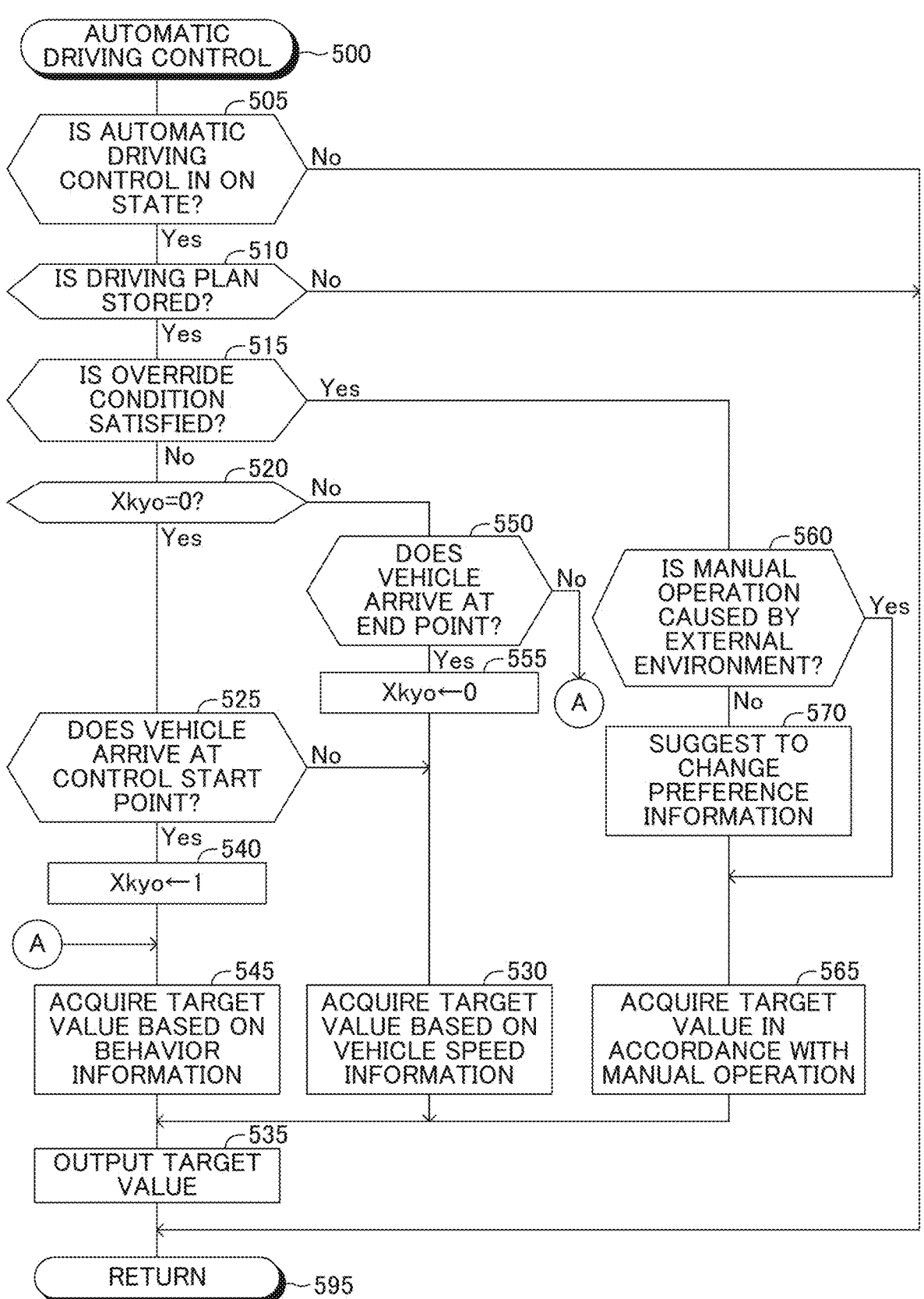
FIG. 5 is a flowchart illustrating an automatic driving control routine executed by the CPU of the ECU shown in FIG. 1.

The CPU of the ECU 20 executes routines shown by the flowcharts in FIGS. 3 to 5 every time a predetermined time elapses.

<Learning Control Routine>

When an appropriate time point comes, the CPU starts a process from step 300 of FIG. 3. At step 305, the CPU determines whether or not the manual driving is being performed. Specifically, the CPU determines that the manual driving is being performed, when the automatic driving control, ACC (Adaptive Cruise Control), LTA (Lane Tracing Assist), and the like are being executed.

If the manual driving is being performed, the CPU makes a "Yes" determination at step 305 and performs steps 310 to 325.

Step 310: The CPU acquires the vehicle speed Vs.

Step 315: The CPU acquires the current position.

Step 320: The CPU stores the vehicle speed Vs and the current position as vehicle speed information in the vehicle speed information storage unit 52b.

Step 325: The CPU determines whether or not a value of an operation flag Xope is "0".

The value of the operation flag Xope is set to "1" when the manual operation starts and is set to "0" when the manual operation ends. The value of the operation flag Xope is set to "0" in an initialization routine. The initialization routine is executed by the CPU when an ignition key switch (not shown) of the vehicle VA is changed from an off position to an on position.

If the value of the operation flag Xope is "0", the CPU makes a "Yes" determination at step 325 and the process proceeds to step 330. At step 330, the CPU determines whether or not the manual operation has started. In detail, when the accelerator operation amount AP is equal to or greater than a start threshold APst, the CPU determines that an acceleration operation has started. When the brake operation amount BP is equal to or greater than a start threshold BPst, the CPU determines that a deceleration operation has started. When the steering angle θs is equal to or greater than a start threshold value θst, the CPU determines that a steering operation has started.

If the manual operation has not started, the CPU makes a "No" determination at step 330, the process proceeds to step 395 and the CPU terminates the present routine tentatively. On the other hand, if the manual operation has started, the CPU makes a "Yes" determination at step 330 and executes steps 335 to 345.

Step 335: The CPU sets the value of the operation flag Xope to "1".

Step 340: The CPU registers the current position of the vehicle VA in the start point of the behavior information and registers the type of the manual operation in the type of the behavior information.

Step 345: If the type of the manual operation is either the acceleration operation or the deceleration operation, the CPU registers the current acceleration G in the acceleration of the behavior information. If the type of the manual operation is the steering operation, the CPU registers the current steering angle θs in the steering angle of the behavior information.

The process then proceeds to step 395 and the CPU terminates the present routine tentatively.

If the value of the operation flag Xope is "1" when the process proceeds to step 325, the CPU makes a "No" determination at step 325 and the process proceeds to step 350. At step 350, the CPU determines whether or not the manual operation has ended. In detail, when the accelerator operation amount AP is equal to or smaller an "end threshold APen, which is a smaller value than the start threshold APst", the CPU determines that the acceleration operation has ended. When the brake operation amount BP is equal to or smaller than an "end threshold BPen, which is a smaller value than the start threshold BPst", the CPU determines that the deceleration operation has ended. When the steering angle θs is equal to or smaller than an "end threshold value Ben of a value smaller than the start threshold value θst", the CPU determines that the steering operation has ended.

If the manual operation has not ended, the CPU makes a "No" determination at step 350 and the process proceeds to step 345.

If the manual operation has ended, the CPU makes a "Yes" determination at step 350 and the CPU executes steps 355 and 360.

Step 355: The CPU sets the value of the operation flag Xope to "0".

Step 360: The CPU registers the current position of the vehicle VA in the end point of the behavior information.

The process then proceeds to step 345.

<Driving Plan Generation Routine>

When an appropriate time point comes, the CPU starts a process from step 400 of FIG. 4. At step 405, the CPU determines whether or not the user input the destination. As an example, the user inputs the destination by tapping the destination in the map data displayed on the display device 48.

If the user does not input the destination, the CPU makes a "No" determination at step 405. In this case, the process proceeds to step 495 and the CPU terminates the present routine tentatively.

If the user inputs the destination, the CPU makes a "Yes" determination at step 405, and executes steps 410 and 415.

Step 410: The CPU generates the route from the current position of the vehicle VA to the destination based on the map data.

Step 415: The CPU determines whether or not the route includes the start point of the behavior information.

If the route includes the start point of the behavior information, the CPU makes a "Yes" determination at step 415 and executes steps 420 to 430.

Step 420: The CPU sets the control start point for the start point included in the route based on the preference information. In detail, the CPU sets a point a predetermined distance ahead of the start point as the control start point when the preference information is "early", sets the start point as the control start point when the preference information is "normal" and sets a point a predetermined distance behind the start point as the control start point when the preference information is "late".

Step 425: The CPU acquires the vehicle speed Vs of the point included in the route from the vehicle speed information.

Step 430: The CPU stores, as the driving plan, information including the route generated at step 410, the behavior information including the start point included in the route, the control start point set at step 420 and the vehicle speed Vs at the point acquired at step 425.

Thereafter, the process proceeds to step 495 and the CPU terminates the present routine tentatively.

If the route does not include the start point when the process proceeds to step 415, the CPU makes a "No" determination at step 415 and the process proceeds to step 425.

<Automatic Driving Control Routine>

When an appropriate time point comes, the CPU starts a process from step 500 in FIG. 5. At step 505, the CPU determines whether or not the automatic driving control is in an on state. After the user inputs the destination, an execution button is displayed on the display device 48. The execution button is a button for changing the automatic driving control to the on state. By the user tapping the execution button, the automatic driving control is changed to the on state.

If the automatic driving control is in the on state, the CPU makes a "Yes" determination at step 505 and the process proceeds to step 510. At step 510, the CPU determines whether or not the driving plan is stored. If the driving plan is stored, the CPU makes a "Yes" determination at step 510 and the process proceeds to step 515. At step 515, the CPU determines whether or not the manual operation satisfies the override condition.

In detail, the CPU determines that the manual operation satisfies the override condition when at least one of the following conditions OV1 to OV3 is satisfied.

Condition OV1: The accelerator operation amount AP is equal to or greater than an override threshold APor.

Condition OV2: The brake operation amount BP is equal to or greater than an override threshold BPor.

Condition OV3: The steering angle θs is equal to or greater than an override threshold θor.

The override threshold values APor, BPor, and θor are set to values greater than the start threshold values APst, BPst, and θst, respectively.

If no manual operation is performed or the manual operation does not satisfy the override condition, the CPU makes a "No" determination at step 515 and the process proceeds to step 520. At step 520, the CPU determines whether or not a value of a behavior flag Xkyo is "0". The value of the behavior flag Xkyo is set to "1" when the vehicle VA arrives at the control start point of the driving plan, and is set to "0" when the vehicle VA arrives at the end point of the driving plan. The value of behavior flag Xkyo is set to "0" in the initialization routine.

If the value of the behavior flag Xkyo is "0", the CPU makes a "Yes" determination at step 520 and the process proceeds to step 525. At step 525, the CPU determines whether or not the vehicle VA arrives at the control start point of the driving plan.

If the vehicle VA does not arrive at the control start point, the CPU makes a "No" determination at step 525 and executes step 530 and step 535.

Step 530: The CPU acquires a target acceleration Gtgt as a target value based on the vehicle speed information in the driving plan. In detail, the CPU refers to the vehicle speed information to acquire the vehicle speed at a position closest to the current position of the vehicle VA. The CPU acquires the target acceleration Gtgt to match the vehicle speed Vs with the acquired vehicle speed.

Step 535: The CPU outputs the above target acceleration Gtgt to the powertrain actuator 40 and the brake actuator 42. Thereby, the powertrain actuator 40 and the brake actuator 42 are controlled so that the acceleration G matches the target acceleration Gtgt, respectively.

Thereafter, the process proceeds to step 595 and the CPU terminates the present routine tentatively.

If the vehicle VA arrives at the control start point when the process proceeds to step 525, the CPU makes a "Yes" determination at step 525 and executes step 540 and step 545.

Step 540: The CPU sets the value of the behavior flag Xkyo to "1".

Step 545: The CPU acquires a target value based on the behavior information of the driving plan. In detail, when the type of the behavior information is any one of the "acceleration" and the "deceleration", the CPU acquires a target acceleration Gtgt to match the acceleration G with "the acceleration of the behavior information at the position closest to the current position of the vehicle VA. If the type of the behavior information is the "steering," the CPU acquires a target steering angle θtgt to match the steering angle θs with "the steering angle of the behavior information at the position closest to the current position of the vehicle VA.

Thereafter, the process proceeds to step 535. If the target steering angle θtgt is acquired as the target value at step 545, the CPU outputs the target steering angle θtgt to the steering motor 44 at step 535. The steering motor 44 is controlled so that the steering angle θs matches the target steering angle θtgt.

A control for matching the acceleration G or the steering angle θs with the target value acquired at step 545 is referred to as the behavior control.

If the value of the behavior flag Xkyo is "1" when the process proceeds to step 520, the CPU makes a "No" determination at step 520 and the process proceeds to step 550. At step 550, the CPU determines whether or not the vehicle VA arrives at the end point of the behavior information included in the driving plan.

If the vehicle VA does not arrive at the end point, the CPU makes a "No" determination at step 550 and the process proceeds to step 545. If the vehicle VA arrives at the end point, the CPU makes a "Yes" determination at step 550 and the process proceeds to step 555. At step 555, the CPU sets the value of the behavior flag Xkyo to "0" and the process proceeds to step 530.

If the manual operation satisfies the override condition when the process proceeds to step 515, the CPU makes a "Yes" determination at step 515 and the process proceeds to step 560. At step 560, the CPU determines, based on the environmental information, whether or not the manual operation that satisfied the override condition is caused by the external environment. In detail, as described above, the CPU determines whether or not there is another vehicle around the vehicle VA.

If the manual operation is caused by the external environment, the CPU makes a "Yes" determination at step 560 and the process proceeds to step 565. At step 565, the CPU acquires the target value in accordance with the manual operation. In detail, the CPU acquires the target acceleration Gtgt in accordance with the accelerator operation amount AP when the above condition OV1 is satisfied, the target acceleration Gtgt in accordance with the brake operation amount BP when the above condition OV2 is satisfied, and the target steering angle θtgt in accordance with the steering angle θs when the above condition OV3 is satisfied. Thereafter, the process proceeds to step 535.

If the manual operation is not caused by the external environment, the CPU makes a "No" determination at step 560 and the process proceeds to step 570. At step 570, the CPU suggests to the user that the preference information should be changed by displaying the preference information change screen on the display device 48. Thereafter, the process proceeds to step 565.

If the automatic driving control is in an off state when the process proceeds to step 505, the CPU makes a "No" determination at step 505. In this case, the process proceeds to step 595 and the CPU terminates the present routine tentatively.

If the driving plan is not stored when the process proceeds to step 510, the CPU makes a "No" determination at step 510. In this case, the process proceeds to step 595 and the CPU terminates the present routine tentatively.

First Modification Example

If the manual operation that satisfies the override condition is performed during the automatic driving control and the manual operation is not caused by the external environment, the ECU 20 according to the first modification example determines whether or not the manual operation starts before the vehicle VA arrives at the control start point. If the manual operation starts before the vehicle VA arrives at the control start point, the ECU 20 suggests to the user that the preference information should be changed to be earlier than the current designation. If the manual operation starts after the vehicle VA arrives at the control start point, the ECU 20 suggests to the user that the preference information should be changed to be later than the current designation. The present modification example can suggest to the user the preference that matches a timing of the user's manual operation.

Figure 6:
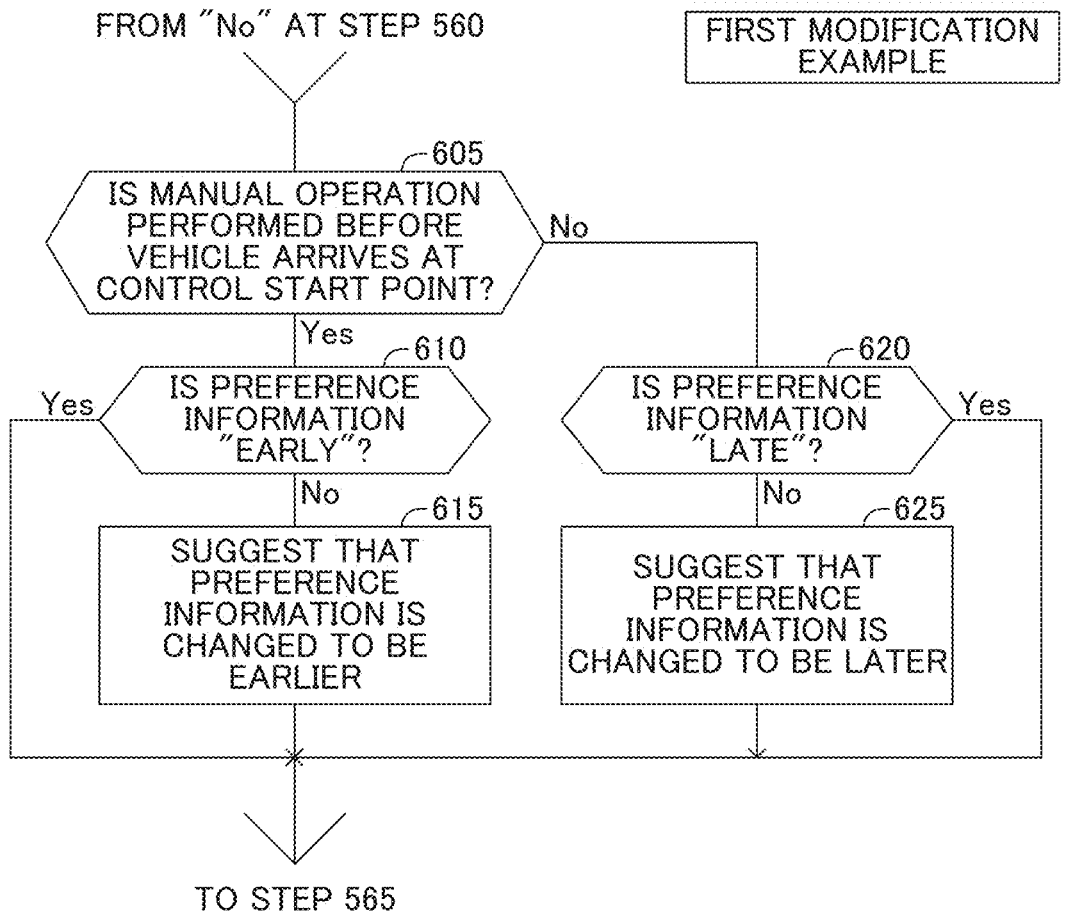
FIG. 6 is a flowchart illustrating a part of the automatic driving control routine executed by the CPU of the ECU according to a first modification example of the embodiment of the present disclosure.

In detail, if the CPU of the ECU 20 according to the present modification example makes a "No" determination at step 560 shown in FIG. 5, the process proceeds to step 605 shown in FIG. 6. At step 605, the CPU determines whether or not the manual operation satisfying the override condition is performed before the vehicle VA arrives at the control start point. The CPU selects, as the control start point for the determination in step 605, the control start point that is closest to the current position of the vehicle VA and within a predetermined distance from the current position of the vehicle VA.

If the manual operation is performed before the vehicle VA arrives at the control start point, the CPU makes a "Yes" determination at step 605 and the process proceeds to step 610. At step 610, the CPU determines whether or not the designation of the preference information is "early".

If the designation of the preference information is not the "early" (i.e., if the designation of the preference information is the "normal" or the "late"), the CPU makes a "No" determination at step 610 and the process proceeds to step 615. At step 615, the CPU suggests to the user that the preference information should be changed to be earlier than the current designation. Thereafter, the process proceeds to step 565 in FIG. 5. If the designation of the preference information is "early", the CPU makes a "Yes" determination at step 610 and the process proceeds to step 565 in FIG. 5.

On the other hand, if the manual operation is performed after the vehicle VA arrives at the control start point when the process proceeds to step 605, the process proceeds to step 620. At step 620, the CPU determines whether or not the designation of the preference information is the "late".

If the designation of the preference information is not the "late" (i.e., if the preference information is the "normal" or the "early"), the CPU makes a "No" determination at step 620 and the process proceeds to step 625. At step 625, the CPU suggests to the user that the preference information should be changed to be later than the current designation. Thereafter, the process proceeds to step 565 in FIG. 5. If the designation of the preference information is the "late", the CPU makes a "Yes" determination at step 620, and the process proceeds to step 565 in FIG. 5.

Second Modification Example

The ECU 20 according to the present modification example identifies, as a corresponding point, the start point closest to the point at which the manual operation is performed, when the manual operation satisfying the override condition is performed during the automatic driving control and the manual operation is not caused by the external environment. The ECU 20 determines whether or not at least one of the following conditions PA1 and PA2 was satisfied at a past time point when the vehicle VA was located at the corresponding point during the manual driving. The condition PA1 and the condition PA2 may be referred to as a first condition and a second condition, respectively.

Condition PA1: Another vehicle was present around vehicle VA.

Condition PA2: Construction work was being conducted within a predetermined range from the corresponding point.

Even if at least one of the conditions PA1 and PA2 was satisfied at the past time point, at least one of the conditions PA1 and PA2 may no longer be satisfied afterwards. In such a case, if the behavior of the vehicle VA at the past time point is reproduced, it is highly likely that the behavior of the vehicle VA does not match the user's intention. In this case, the user is likely to perform the manual operation that satisfies the override condition.

If at least one of the conditions PA1 and PA2 was satisfied at the past time point, the ECU 20 asks the user whether or not to relearn the behavior of vehicle VA. If the user permits relearning the behavior of vehicle VA, the ECU 20 changes the automatic driving control to the off state, and relearn the behavior of vehicle VA during the manual driving. The ECU 20 according to the present modification example can relearn the behavior of the vehicle VA that is suitable for the current situation. Thus, the possibility of the user feeling uncomfortable with the automatic driving control can be reduced.

Figure 7:
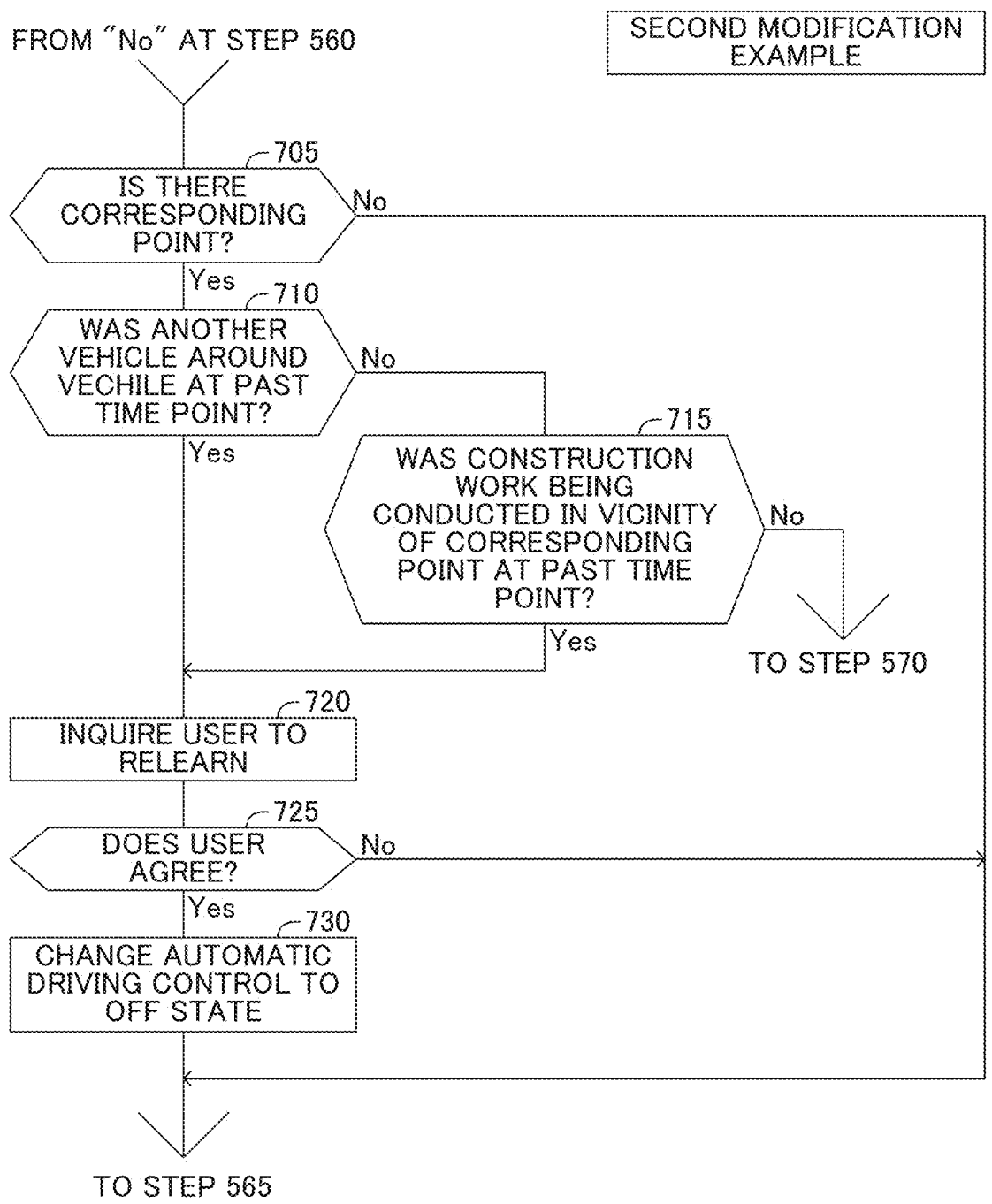
FIG. 7 is a flowchart illustrating a part of the automatic driving control routine executed by the CPU of the ECU according to a second modification example of the embodiment of the present disclosure.

In detail, when the CPU of ECU 20 according to the present embodiment makes a "No" determination at step 560 shown in FIG. 5, the process proceeds to step 705 shown in FIG. 7. At step 705, the CPU refers to the behavior information so as to determine whether or not there is the start point (the corresponding point) within a predetermined distance from the current position of the vehicle VA (a point at which the manual operation that satisfies the override condition is performed).

By the way, in the present modification example, when the manual operation starts in the learning control routine (step 330 "Yes" in FIG. 3), at step 340, the CPU acquires the environmental information and construction information so as to store the behavior information including the environmental information and the construction information in the behavior information storage 52*a*. The construction information includes information indicating whether or not a construction is being performed within a predetermined range from the current position of the vehicle VA. The CPU acquires the construction information by referring to the map data stored in the map data storage unit 24*b*.

If there is the corresponding point, the CPU makes a "Yes" determination at step 705 shown in FIG. 7, and the process proceeds to step 710. At step 710, the CPU determines whether or not the condition PA1 was satisfied at the past time point by referring to the environmental information included in the behavior information of the corresponding point.

If the condition PA1 was not satisfied at the past time point, the CPU makes a "No" determination at step 710 and the process proceeds to step 715. At step 715, the CPU determines whether or not the condition PA2 was satisfied at the past time point by referring to the construction information included in the behavior information at the corresponding point.

If the condition PA2 was not satisfied at the past time point, the CPU makes a "No" determination at step 715 and the process proceeds to step 570 shown in FIG. 5.

If the condition PA1 was satisfied at the past time point when the process proceeds to step 710, the CPU makes a "Yes" determination at step 710 and executes steps 720 and 725.

Step 720: The CPU inquires the user whether or not to relearn the behavior of the vehicle VA. In detail, the CPU displays a query screen on the display device 48 to inquire whether or not to relearn the behavior of the vehicle VA. This inquiry screen includes a Yes button and a No button.

Step 725: The CPU determines whether or not the user agrees to relearn the behavior of the vehicle VA. In detail, the CPU determines that the user agrees to relearn the behavior of the vehicle VA when the Yes button is touched, and determines that the user rejects to relearn the behavior of the vehicle VA when the No button is touched.

If the user agrees to relearn, the CPU makes a "Yes" determination at step 725 and the process proceeds to step 730. At step 730, the CPU changes the automatic driving control to the off state (in other words, the CPU terminates the automatic driving control). Thereafter, the process proceeds to step 565 shown in FIG. 5. After the automatic driving control is changed to the off state, the user drives manually. The CPU starts to learn the behavior of the vehicle VA.

If the user refuses to relearn, the CPU makes a "No" determination at step 725 and the process proceeds to step 565 shown in FIG. 5.

Third Modification Example

In a case where the construction is being conducted within the predetermined range from the current position of vehicle VA, even if there is no other vehicle around the vehicle VA when the manual operation that satisfies the override condition is performed during the automatic driving control, the ECU 20 may determine that the manual operation is caused by the external environment. In other words, in a case where there is no other vehicle around the vehicle VA and no construction is being conducted within the predetermined range from the current position of vehicle VA, the ECU 20 may determine that the manual operation is not caused by the external environment.

Fourth Modification Example

In the above embodiment, when the value of the behavior flag Xkyo is "0" in the automatic driving control, the vehicle VA is controlled so that the vehicle speed Vs matches the vehicle speed Vs during the manual driving (referring to step 530 and step 535 in FIG. 5). However, the control of vehicle VA when the value of behavior flag Xkyo is "0" in automatic driving control is not limited to this.

As an example, at step 530, the CPU may acquire the target acceleration Gtgt to match the vehicle speed Vs with a preset set vehicle speed Vs. As another example, at step 530, the CPU may acquire the target acceleration Gtgt to match the vehicle speed Vs with the average vehicle speed acquired based on the vehicle speed information.

In the above embodiment, the user designates the reference information by operating the preference designation button 50, but this is not limited to this. For example, the user may designate the preference information by inputting the user's voice or by touching the display device 48.

Furthermore, in the above embodiment, the ECU 20 learns the acceleration G or steering angle θs as a value representing the behavior of vehicle VA that changes due to the manual operation performed during the manual driving, but the value learned by the ECU 20 is not limited to these values. As an example, the ECU 20 may learn vehicle speed Vs instead of acceleration G or a yaw rate instead of the steering angle θs.

Furthermore, in the above embodiment, the ECU 20 performs the suggestion of changing the preference information (step 570 shown in FIG. 5) and the inquiry for relearning (step 720 shown in FIG. 7) by displaying screens on the display device 48, the suggestion of changing the preference information and the inquiry for relearning are not limited to this. As an example, the ECU 20 may perform the suggestion of changing the preference information or suggest a change in preference information and the inquiry for relearning by outputting a voice message from a speaker not shown.

The present apparatus 10 may be applied to (or installed in/on) an engine vehicle, a hybrid electric vehicle (HEV), a plug-in hybrid electric vehicle (PHEV), a fuel cell electric vehicle (FCEV), and a battery electric vehicle (BEV).

What is claimed is:

1. A driving support apparatus comprising:
   a sensor configured to acquire environmental information about an external environment of a vehicle; and a controller configured to execute a learning control for learning, as a learned behavior, a behavior of the vehicle that changes due to a manual operation performed during manual driving, and an automatic driving control for controlling the behavior of the vehicle to reproduce the learned behavior, wherein, the controller is configured to:

start a behavior control for controlling the behavior of the vehicle based on the learned behavior, when the vehicle arrives at a control start point during the automatic driving control, wherein the control start point is specified based on a start point at which the manual operation was performed during the manual driving and a preference of a user for the automatic driving control designated by the user;

when the manual operation performed during the automatic driving control satisfies an override condition, acquire a target value corresponding to an operation amount of the manual operation and control the behavior of the vehicle based on the acquired target value by outputting the target value to an actuator of the vehicle, and determine whether or not the manual operation is caused by the external environment; and suggest to the user to change the preference, when it is determined that the manual operation is not caused by the external environment.

2. The driving support apparatus according to claim 1, wherein the controller is configured to determine that the manual operation is not caused by the external environment, when it is determined that there is no other vehicle around the vehicle based on the environmental information.

3. The driving support apparatus according to claim 1, wherein the preference is a preference relating to whether a start timing at which the behavior control starts is early or late, and wherein, the controller is configured to:

determine whether or not the manual operation is performed before the vehicle arrives at the control start point, when the manual operation satisfies the override condition and the manual operation is not caused by the external environment;

suggest to the user to change the preference so that the start timing is earlier, when the manual operation is performed before the vehicle arrives at the control start point; and suggest to the user to change the preference so that the start timing is later, when the manual operation is performed after the vehicle arrives at the control start point.

4. The driving support apparatus according to claim 1, wherein, the controller is configured to:

determine whether or not at least one of a first condition and a second condition is satisfied, when the manual operation satisfies the override condition and the manual operation is not caused by the external environment, the first condition being a condition that is satisfied when another vehicle around the vehicle was present at a past time point at which the vehicle was located at a corresponding point which is the start point closest to a point at which the manual operation is performed, the second condition being a condition that is satisfied when construction work was being conducted within a predetermined range from the corresponding point at the past time point; and inquire the user whether or not to relearn the learned behavior, when at least one of the first condition and the second condition is satisfied.

* * * * *